Sept. 5, 1967  Z. SZOHATZKY  3,339,949

TUBE COUPLING

Filed Oct. 21, 1965

INVENTOR.
ZOLTAN SZOHATZKY
BY Fay & Fay
ATTORNEYS

United States Patent Office 3,339,949
Patented Sept. 5, 1967

3,339,949
TUBE COUPLING
Zoltan Szohatzky, Mentor Township, Ohio, assignor to Crawford Fitting Company, Solon, Ohio, a corporation of Ohio
Filed Oct. 21, 1965, Ser. No. 499,212
2 Claims. (Cl. 285—342)

This invention relates to tube couplings and more particularly to a wedge type coupling adapted to be used in connection with gas chromatography equipment.

Gas chromatography is a practical laboratory procedure for separating materials in the gas phase. In a typical gas chromatography system, tubing having an outside diameter in the order of 1/16 inch frequently is used. To interconnect such tubing in the gas chromatography equipment, it is necessary to utilize specially designed, miniaturized fittings or micro-couplings. The extreme miniaturization required in the design of such fittings has presented substantial problems. Thus, it is necessary to provide a coupling which will securely grip the fine tubing to provide a leak tight joint, but one which will not damage the tubing in the coupling action.

In addition, since experimental and instrumentation systems, such as gas chromatography, are often used for a variety of fluids or gases, it frequently becomes necessary to purge the system of the previous gases before introduction of a different gas. In the interest of a complete purging, design considerations demand the elimination of the crevices, pockets and the like which would trap the unwanted gas despite the purging operation. The coupling of the instant embodiment fulfills this design requirement in that the dead space in the interior of the fitting is minimized along with the elimination of crevices, traps, pockets and the like. In the instant invention, the fluid passages are of simple, smooth design and are provided with means to preclude fluid contact with threads and like structure which would make a complete purging difficult at best.

An additional design requirement is that the coupling, to be used effectively in an experimental system, must be capable of installation with a minimum of difficulty, so that a particular setup may be altered according to the particular need on any specific analysis.

It is an object of this invention to provide an improved micro-coupling.

It is another object of this invention to provide a micro-coupling having a wedging action.

It is a further object of this invention to provide a micro-coupling which has a minimum dead space in the interior thereof.

A still further object of this invention is to provide an improved micro-coupling which prevents the entrapment of gases in the system.

To the accomplishment of the foregoing objects and other related ends, the coupling includes a resilient gripping element adapted circumferentially to surround an end portion of a tubing. The outer surface of the gripping element tapers radially outwardly and axially of the tubing from the free end thereof to a point spaced from the tube end. The end portion of the gripping element is provided with a radially outwardly extending circumferential bead. The gripping element is pressed into coupling relationship with the tubing by introducing the free end of the tube and gripping element into a tapered opening of a female fitting component. As the gripping element is advanced inwardly of the tapered opening, the bead engages the surface of the opening whereby the gripping element is compressed radially inwardly of the tubing.

Other and more specific features will become more apparent upon a complete reading of the following description which sets forth in detail one approved means of carrying out the invention. Such disclosed means are not meant to be limiting inasmuch as it constitutes but one of the various ways in which the principles of the invention may be applied.

In the drawings wherein like reference numerals indicate like parts in the various views.

Figure 1:
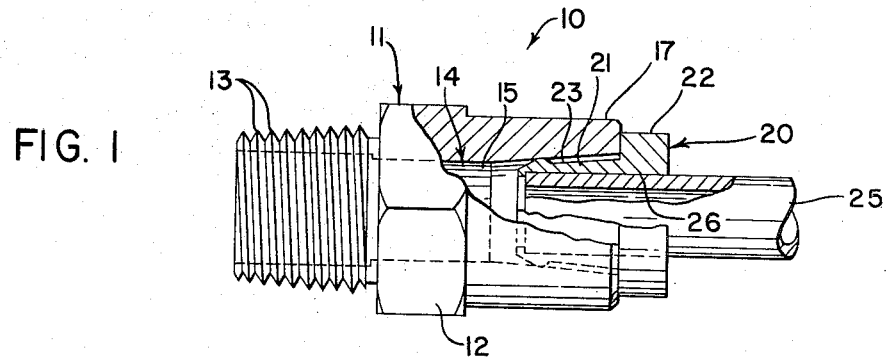
FIG. 1 is a side elevation view, partly in section, showing the micro-coupling in an assembled relation.
Figure 2:
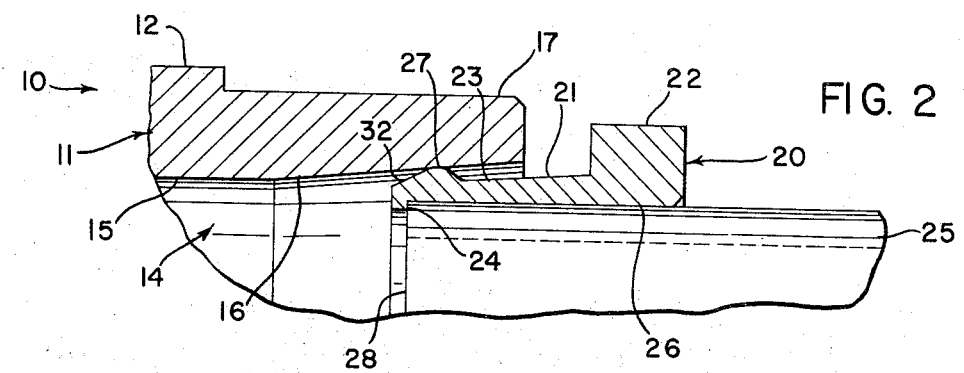
FIG. 2 is a magnified view of a portion of the coupling illustrated in FIG. 1 showing the tube and the gripping element as they are inserted in the fitting.

Referring now to the drawings, FIG. 1 shows a micro-coupling device indicated generally by the reference numeral 10 which embodies the principles of the instant invention. The coupling 10 includes a coupling body 11 which may be provided intermediate its ends with tool pads 12 or other wrench engaging surfaces. Threads 13 are provided on one end of the body 11 whereby the body may be attached to a suitable supporting base.

Extending longitudinally through the body 11 is a passageway indicated generally by the reference numeral 14. The passageway 14 includes a central bore 15 which opens outwardly of the body 11 through the threaded end 13. The bore 15 at its other end includes an outwardly tapering axially extending opening 16 which is formed in the terminal portion 17 of the body 11. The opening 16 comprises a coaxial annular tapered or frusto conical camming mouth, with the inner apical diameter being greater than the outer diameter of the tubing which is to be received therein.

Adapted to be received in the mouth 16 of the body 11 is a complementary coupling member or gripping element generally indicated by the reference numeral 20. This coupling member includes a longitudinally extending body 21 from which projects a radially extending flange 22. The flange 22 has a radial dimension such that it will abut the terminal portion 17 of the body 11 when the coupling is assembled. The body 21 includes an external surface 23 which tapers at an angle approximately equal to the tapering angle of the mouth 16 in the body 11. The body 21 terminates in a radially inwardly extending flange 24 which is adapted to serve as an abutment for a tube 25 inserted in the central bore 26 extending through the member 20. The central bore 26 is of a diameter closely approximating the outer diameter of the tubing 25 so that there is at least a light frictional grip of the tubing by the gripping member 20 when the tubing is inserted in the bore 26.

At a position approximating the terminal portion of the body 21, there is formed a radially outwardly extending circumferential bead 27, with the radial dimension of the bead being greater than the inner apical diameter of the opening 16 and less than the diameter of the outermost point of the opening 16. By this relationship, it is apparent that member 20 is receivable in opening 16 only to a limited extent.

The coupling member or gripping element 20 may be made from a diversity of materials including metal or plastic but is preferably made from plastic.

Figure 3:
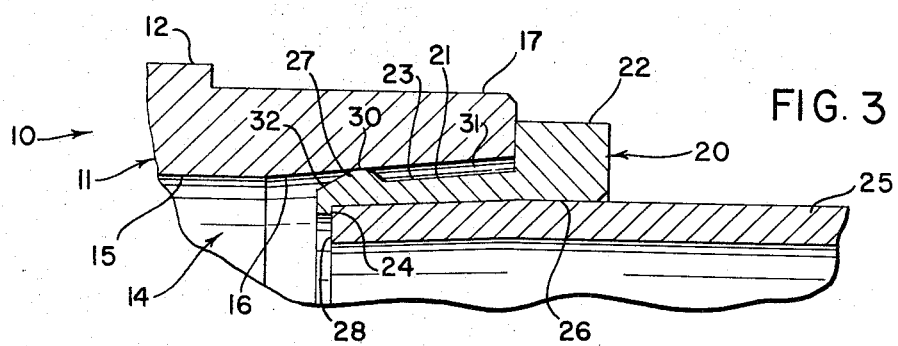
FIG. 3 is a view similar to FIG. 2 showing the tubing in coupled relation.
Figure 4:
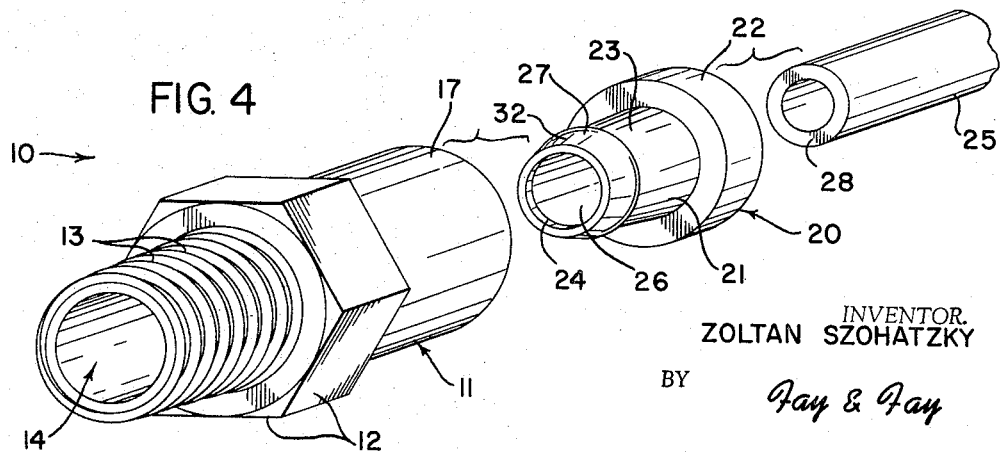
FIG. 4 is an exploded perspective view showing the components of the fitting.

The above described coupling operates in the following manner: When it is desired to interconnect a piece of tubing with another element, the tubing 25 is inserted in the bore 26 in the gripping element 20 with the terminus 28 of the tube abutting the inwardly extending flange 24. In such a position, there should be a sufficient frictional grip between the tube and the gripping element adequate to maintain the gripping element on the surface of the tube. The member 20 is then inserted in the tapering mouth 16. As the coupling member is inserted in the mouth, the bead 27 engages the tapered surface of the mouth 16 intermediate its ends. As the element 20 further enters the opening 16, the portion of the body 21 which includes bead 27 is cammed radially inward as shown in FIG. 3. In such a condition, the inward movement of the gripping element causes a frictional engagement of the tube by the element 20 and a slight deformation of the end of the tube 25. Thus, the tube 25 is frictionally gripped by the member 20 in a position such that the tubing is effectively coupled to the body 11. The flange 22 cooperates with the terminal portion 17 of the body 11 to prevent excessive deformation of the tube by limiting the inward movement of the coupling member 20.

It is believed apparent that the objects set forth above have been fully accomplished. Thus, there is provided a simple device which permits the ready coupling of a tube to a source of gas pressure. Moreover, the coupling has a minimum of co-acting parts so that tolerances, which would be difficult to maintain in a miniaturized coupling, are not critical. In addition, the coupling in an assembled relation provides a single point of contact between the gripping member and the body, as indicated by the reference numeral 30 in FIG. 3. This point of contact is substantially at the terminal end of the tubing 25 and is adequate to prevent the penetration of the gas in the system to the space 31 between the bead 27 and the flange 22. In addition, the forward portion of the bead 27, as indicated at 32, is radially tapering inwardly and thereby precludes the entrapment of any gas in this area. As a result, when the chromatography operation has been completed, it is a simple matter to purge the system of all gaseous residue and there need be no concern of entrapment of gas at the points of contact between the gripping member and the body.

Additional modifications and changes will suggest themselves to those having ordinary skill in the art. Changes such as these are contemplated by the principles of this invention so that, although for ease of description, the principles of the invention have been set forth in connection with but a single illustrated embodiment, it is not intended that this embodiment or the terminology employed in describing it is to be limiting, but rather, it is my desire to be restricted only by the scope of the appended claims.

I claim:
1. A micro-coupling comprising:
a coupling body;
a passage through said body adapted to receive a piece of tubing therein;
the passage including an axially extending radially outwardly tapering mouth at one end thereof;
a gripping element including a central bore therethrough and being adapted to be received over the end of a piece of tubing;
said gripping element including a longitudinally extending body terminating in a radially inwardly extending flange at one end thereof;
the other end of said body including a radially outwardly extending flange adapted to abut the terminal portion of said coupling body;
a bead formed on said gripping element intermediate said flanges;
said bead being radially outwardly extending relative to said gripping element and extending circumferentially therearound;
the radial dimension of said bead being greater than the diameter of the axially inner end of said tapered mouth and less than the diameter of the axially outer end of said tapered mouth whereby said gripping member is receivable in said tapered mouth with said bead engaging the wall thereof intermediate its ends.
2. A micro-coupling comprising:
a coupling body having a passageway therethrough;
said passageway including a frusto conical camming mouth;
an elongated resilient gripping element adapted circumferentially to surround an end portion of a piece of tubing;
said element including a radially outwardly extending circumferential bead adjacent one end thereof;
said bead being of a radial dimension such that with said gripping element inserted in said camming mouth, said bead coacts with said camming mouth to cam said one end of said element into frictional engagement with the exterior of the tubing carried thereby.

No references cited.

CARL W. TOMLIN, *Primary Examiner.*

W. L. SHEDD, *Assistant Examiner.*